United States Patent
Park et al.

[11] Patent Number: 5,833,156
[45] Date of Patent: Nov. 10, 1998

[54] FISHING REEL WITH AUTOMATIC BACKLASH CONTROL

[75] Inventors: Michael C. Park; Bruce C. Nepple, both of Portland; Joseph Tanous, Lake Oswego, all of Oreg.

[73] Assignee: Aquametrics Inc., Beaverton, Oreg.

[21] Appl. No.: 844,765

[22] Filed: Apr. 22, 1997

[51] Int. Cl.[6] .............................................. A01K 89/0155
[52] U.S. Cl. ................................. 242/289; 242/223; 43/4
[58] Field of Search .................................. 242/289, 223; 43/4

[56] References Cited

U.S. PATENT DOCUMENTS

| | | | |
|---|---|---|---|
| 4,402,470 | 9/1983 | Hamayasu | 242/223 |
| 4,697,758 | 10/1987 | Hirose et al. | 242/223 |
| 4,714,208 | 12/1987 | Holahan et al. | 242/288 |
| 5,131,165 | 7/1992 | Benson | 43/4 |
| 5,236,147 | 8/1993 | Kaneko | 242/223 |
| 5,345,691 | 9/1994 | Falk et al. | 242/223 |
| 5,351,538 | 10/1994 | McGuire et al. | 43/4 |
| 5,511,335 | 4/1996 | Langer | 43/4 |
| 5,553,940 | 9/1996 | Nishihara | 43/4 |
| 5,560,560 | 10/1996 | Hirose | 242/223 |
| 5,577,679 | 11/1996 | Thomas | 242/223 |
| 5,637,984 | 6/1997 | Chu | 242/223 |
| 5,639,038 | 6/1997 | Hirose | 242/223 |

*Primary Examiner*—Katherine Matecki
*Attorney, Agent, or Firm*—Elmer Galbi

[57] ABSTRACT

Backlash in a fishing reel is eliminated by automatically matching the reel discharge speed to the line speed. The drag on the reel is automatically adjusted so that the reel discharge speed does not exceed the line speed. The invention includes a reel, a mechanism for measuring the relationship between the line speed and the reel discharge speed, an electronically controlled braking device and a microprocessor for controlling the braking device in response to the relationship between the line speed and the reel discharge speed. When the reel discharge speed exceeds the line speed additional braking is applied. One alternative embodiment of the invention intermittently applies a very short pulse of braking action to the reel. The response to this pulse of braking action is detected and used to determine if the reel discharge speed exceeds the line speed.

1 Claim, 7 Drawing Sheets

FIG. 2 (LINE SPEED)

(REEL SPEED AND LINE HEIGHT)

FISHING REEL WITH AUTOMATIC BACKLASH CONTROL

RELATED INVENTIONS

The present invention is a continuation in part of application Ser. No. 08/611,335 filed Mar. 8, 1996 by Michael C. Park and Kenneth J. Park and which is assigned to the same assignee as the present invention.

FIELD OF THE INVENTION

The present invention relates to fishing apparatus and more particularly to automatic backlash control for a fishing apparatus.

BACKGROUND OF THE INVENTION

As used hereinafter (a) the term "reel discharge speed" means the speed at which fishing line is being discharged from a fishing reel and (b) the term "line speed" means the rate at which fishing line is being pulled away from a fishing reel measured at a point several inches away from the fishing reel. In general the reel discharge speed is determined by the circumference of the reel (including the line wound on the reel) and the speed at which the reel is rotating. When a interface unit is cast, the line speed is initially determined by the speed at which the interface unit attached to a line is moving; however, after the initial period the line speed is also affected by factors such as the inertial of the line, the friction to which the line is subjected from line guides and air resistance.

Backlash is a well known problem which occurs when the reel discharge speed exceeds the line speed. Stated differently, backlash occurs when a reel is turning at a rate such that line is discharged from the reel at a higher speed than the line is being pulled away from the reel. When the reel discharge speed exceeds the line speed, the excess line piles up and loops around near the reel causing the line to become tangles in what is often called a "rats nest".

There are a number of inter-related factors which determine whether or not backlash will occur. When a fishing interface unit is cast, initially the linear speed of the interface unit is the primary factor which determines line speed. During the initial stages of casting the linear speed of the interface unit is at a maximum and the line speed is therefore at a maximum. Initially the rotational speed of the reel is zero and as the line speed accelerates to its maximum amount the reel speed is accelerated to a maximum and the reel discharge speed is at a maximum.

After the initial stage (during which the line speed is at a maximum) the line speed gradually decreases due to air resistance and friction. As the interface unit moves through the air it encounters air resistance and the line is subject to friction from the line guides and from the air. Shortly after the interface unit strikes the surface of the water, the line speed goes to zero. After reaching an initial maximum the rotational speed of the reel is decreased by the combination of the friction of the reel bearings, an automatic drag mechanism and possibly by additional friction manually applied by the fisherman. If the rotational speed of the reel does not decrease as the line speed decreases, the discharge speed will exceed the line speed and backlash will occur.

Skillful fishermen avoid backlash by carefully placing their thumb on the spinning reel and applying pressure to the reel to cause friction between their thumb and the moving reel, thereby slowing the rotation of the reel so that the reel discharge speed equals the line speed. If the fisherman applies too much pressure and friction, the line speed will unnecessarily be decreased and casting distance will be decreased. Very few fisherman can appropriately regulate the pressure on the line such that backlash does not occur and yet such that casting distance is not unnecessarily decreased.

Some reels have a manual drag control that can be set to automatically apply drag to the line. Unfortunately such devices generally decrease casting distance since at various times during the casting cycle they apply more drag to the line than is needed to eliminate backlash.

SUMMARY OF THE INVENTION

The present invention eliminates backlash by automatically matching the reel discharge speed to the line speed. The drag on the reel is automatically adjusted so that the reel discharge speed does not exceed the line speed. The present invention includes a reel, a mechanism for measuring the relationship between the line speed and the reel discharge speed, an electronically controlled braking device and a microprocessor for controlling the braking device in response to the relationship between the line speed and the reel discharge speed. When the reel discharge speed exceeds the line speed additional braking is applied. One alternative embodiment of the invention intermittently applies a very short pulse of braking action to the reel. The response to this pulse of braking action is detected and used to determine if the reel discharge speed exceeds the line speed.

DETAILED DESCRIPTION OF PREFERRED EMBODIMENTS

Figure 1:
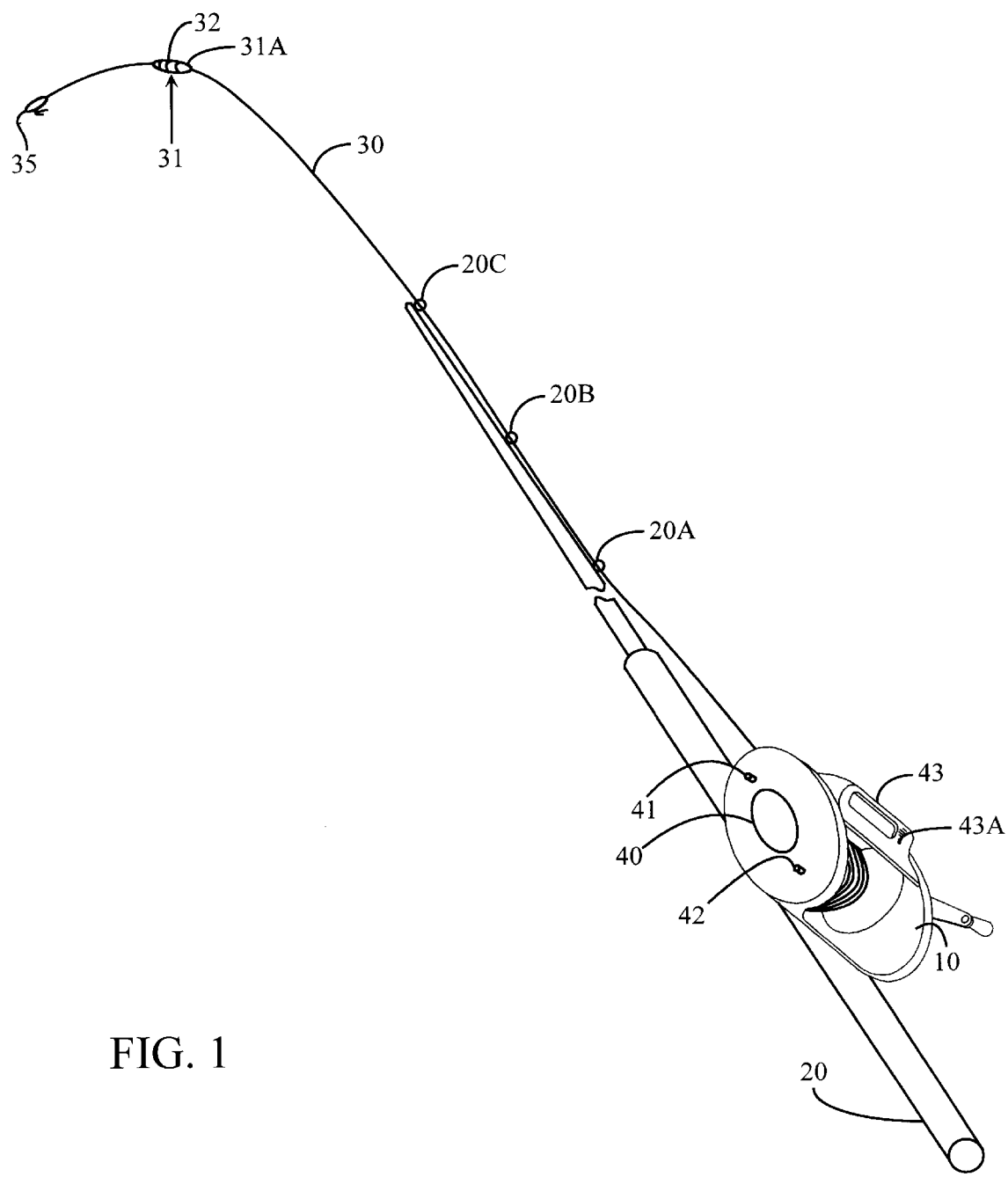
FIG. 1 is an overall diagram of a fishing rod and reel which includes a first embodiment of the present invention.

FIG. 1 shows a reel 10 attached to a rod 20. A fishing line 30 extends from reel 10 through line guides 20A, 20B and 20C to an interface unit 31 and then to a fishing lure 35. Attached to reel 10 are a rotational braking mechanism 40, a rotational speed measuring device 41, a spool radius measurement 42 which indicates the amount of line on reel 10 and a microprocessor 43. Interface unit 31 includes an accelerometer 32 which indicates if the linear speed of interface unit 31 is increasing or decreasing. Line 30 is made of fiber optic material and it conducts data signals from interface unit 31 to microprocessor 43. (The details of such a fiber optic line are described in co-pending patent application Ser. No. 08/611,335 filed Mar. 8, 1996.)

Figure 2:
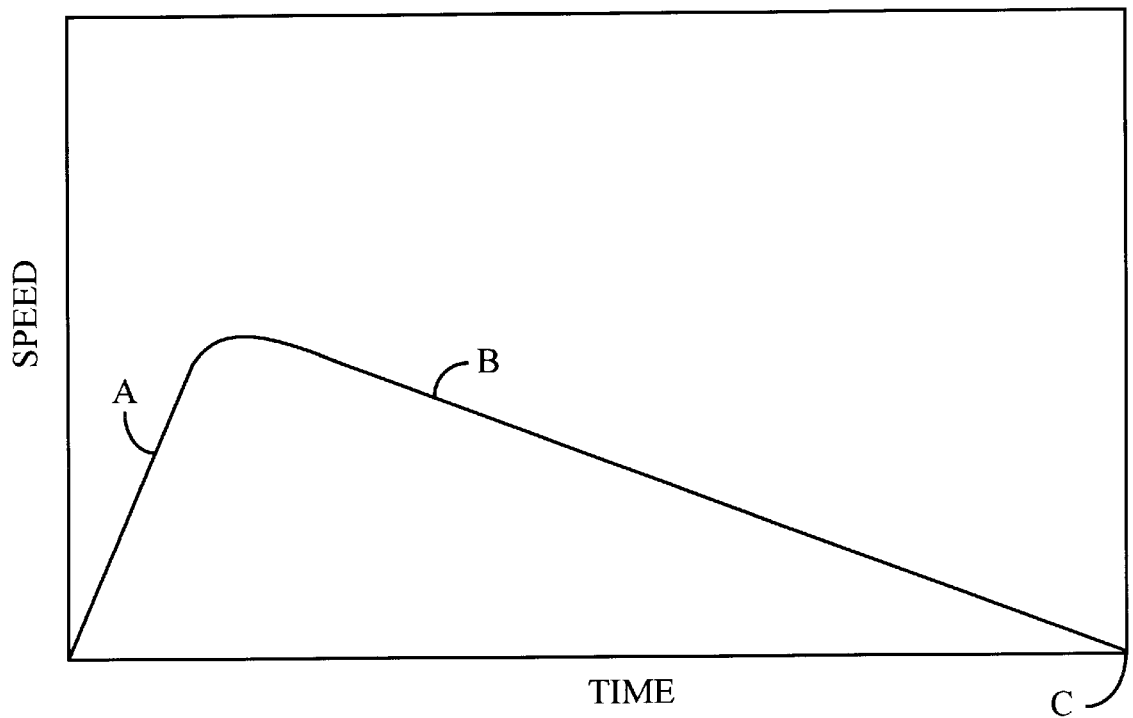
FIG. 2 is a graph showing line speed relative to time.

The speed at which lure 35 moves during a typical cast is shown in FIG. 2. The curve in FIG. 2 has three regions designated A, B, and C. When the lure 35 is cast, in the initial stage of the cast the linear speed of the lure increases as shown by section A of the curve. In the second stage the lure flies through the air, and its speed is gradually decreased by air friction. This is indicated by the section of the curve designated as B. Finally the lure hits water and it linear speed essentially goes to zero. This is indicated by section C of the curve. The exact shape of the curve representing the speed of a particular lure depends on various factors such as the length of the fishing pole, the skill and strength of the fisherman etc.; however, in general the speed profile of a lure will have the three sections shown in FIG. 2.

The accelerometer 32 is a conventional commercially available accelerometer which generates a signal proportional to the linear acceleration of the interface unit 31. Circuit 31A (which is shown in co-pending application Ser. No. 08/611,335 filed Mar. 8, 1996) transmits the signals from accelerometer 32 to microprocessor 42 via optical fiber in line 30. The microprocessor calculates the linear speed of said interface unit (and thus the linear speed of line 30 and lure 35) from the acceleration signals supplied by said microprocessor.

Microprocessor 43 receives three signals (1) a signal from accelerometer 32 which indicates the acceleration of interface unit 31 (2) a signal from speed measurement device 41 which indicates the rotational speed of reel 10 and (3) a signal from radius measurement device 42 which indicates the thickness or depth of the line on reel 10 and thus the effective radius of reel 10. The microprocessor 43 can calculate the speed at which the interface unit 31 is moving by integrating the acceleration signals over time. The reel discharge speed should equal the line speed calculated by the microprocessor 43.

A reset button 43A resets the processor and which activates the microprocessor to begin monitoring the input signals looking for a sharp increase in the acceleration of interface unit 31 thereby indicating that a cast has begun. The microprocessor 43 generates a signal which controls brake 40. The microprocessor 43 monitors the difference between reel discharge speed and line speed and controls brake 40 so that the reel discharge speed does not exceed the line speed. The microprocessor operation is explained later with reference to the flow diagram in FIG. 5.

Figure 3:
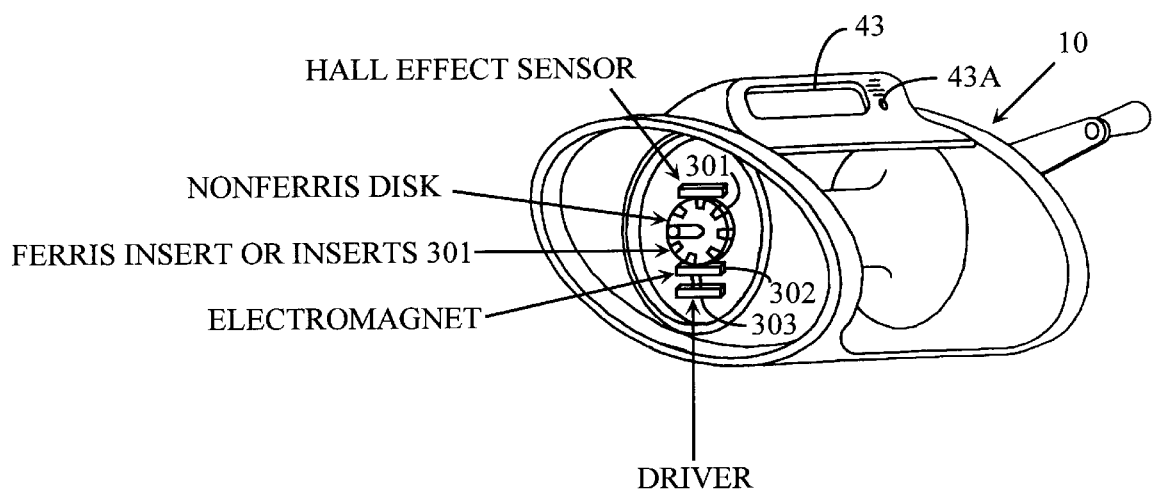
FIG. 3 is a diagram of a reel braking mechanism.
Figure 4:
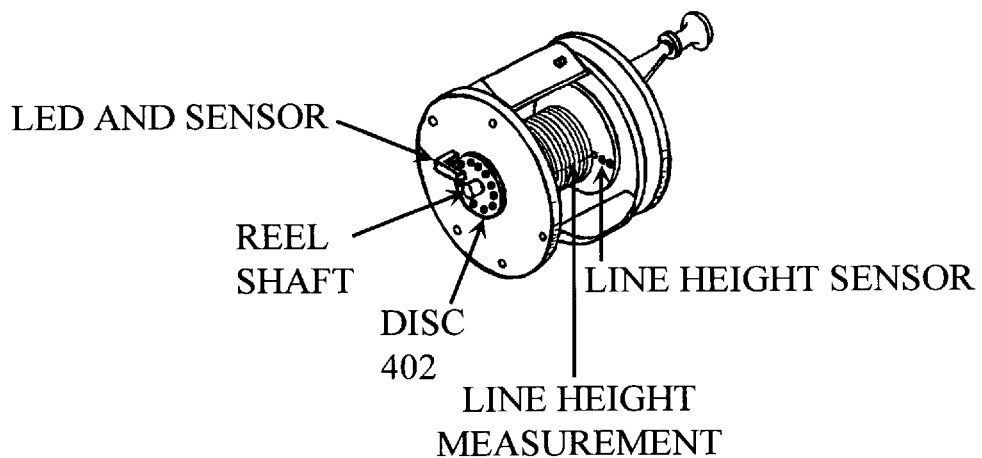
FIG. 4 shows the reel speed and radius measuring apparatus.
Figure 4A:
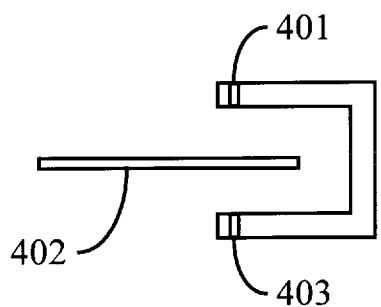

As shown in FIG. 3, brake 40 includes a number of permanents magnets 301 which are attached to and which rotate with the shaft of reel 10. A stationary electromagnet 302 is attached to the frame of reel 10. The currents in electromagnet 302 can be controlled by magnetic driver control 303 which is in turn controlled by microprocessor 43. As shown in FIGS. 4 and 4A speed measuring device 41 includes a light emitting diode (LED) 401, a slotted disk 402, and a photoreceptor 403. The photoreceptor 403 generates a series of pulses the frequency of which are proportional to the rotational speed of reel 10. These pulses form an input to microprocessor 43.

Figure 5:
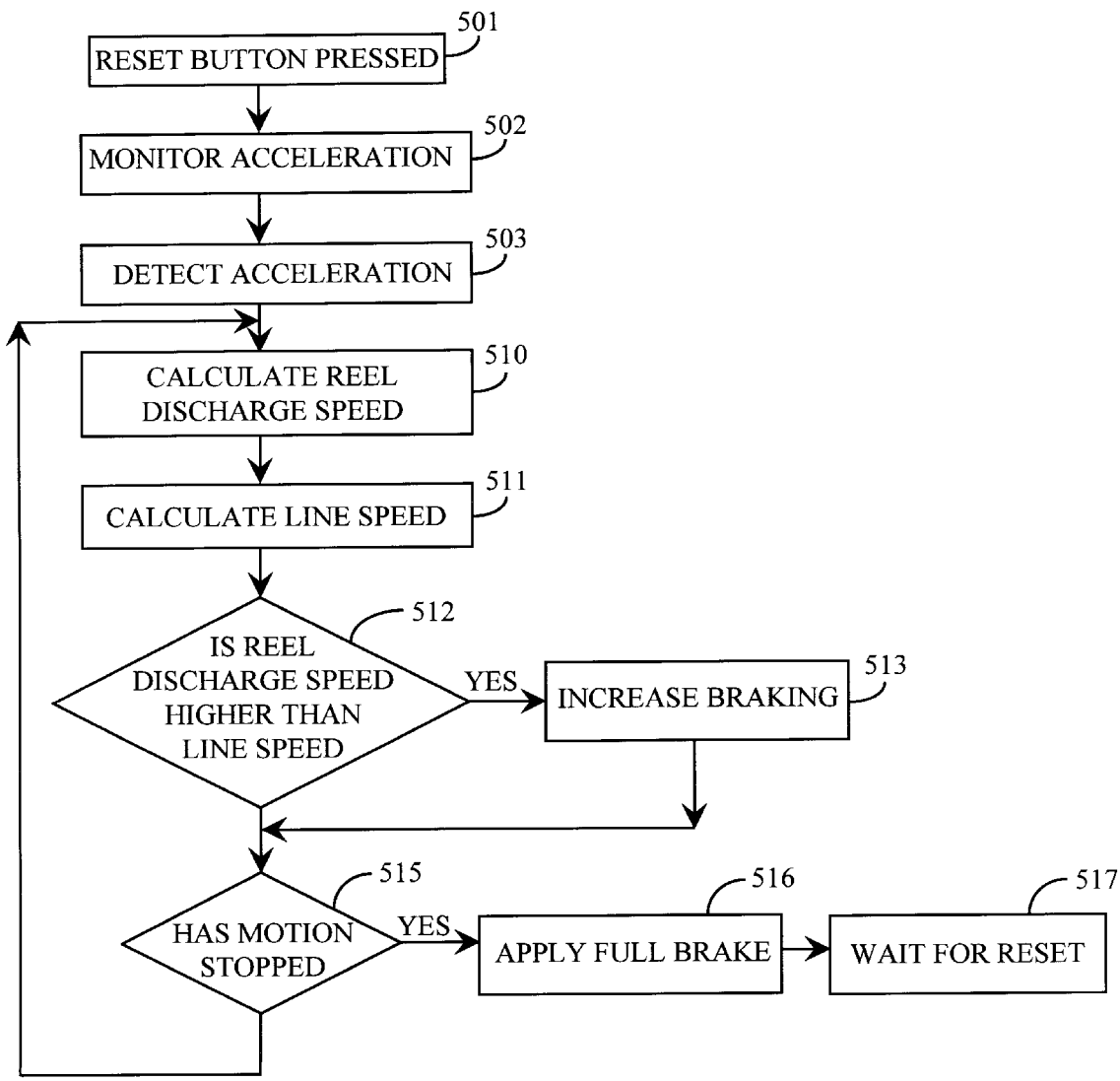
FIG. 5 is a flow diagram of the operations performed by the microprocessor shown in FIG. 1.

The operation of the microprocessor 43 is shown with reference to FIG. 5. The microprocessor 43 is a commercially available microprocessor operating according to a commercially available operating system. Microprocessor 43 can be anyone of a wide varieties of microprocessors such as the model PIC 16C924 Microprocessor marketed by Microchip Inc. or Chandler, Ariz. The power supply for the microprocessor 43 can be a conventional battery. When reset button 43A is pressed, the microprocessor goes into a monitoring state as shown by blocks 501 and 502. In the monitoring state the microprocessor 43 looks for a sharp increase in the acceleration of interface unit 31 hereby indicating that a casting operation has begun (block 503). As indicated by block 510, once a casting operation has begun, the microprocessor 43 calculates the reel discharge speed from the speed signal received from sensor 42 and the radius signal from radius sensor 42. Next the processor calculates the line speed using the acceleration information from accelerometer 32 and the time period during which each level of acceleration took place (It is noted that commercial microprocessors have a built in crystal which generates timing pulses). As indicated by block 512, the reel discharge speed is then compared to the line speed. If the reel discharge speed is higher than the line speed, a signal is sent to brake 40 to increase the braking action (block 513). Next as indicated by block 515 a check is made to determine if the linear speed or interface unit 31 quickly decrease to nearly zero (that is has the lure 35 and the interface unit 31 hit the surface of water). If the interface unit has hit the surface of the water, i.e. if its speed has approached zero, a signal is sent to the brake 40 (block 515) to apply full braking and the system waits for a reset signal (block 517). If block 515 does not determine that the interface unit has hit the surface of the water, the cycle repeats from block 510. It is noted that with even a low cost commercial microprocessor, the system can cycle through operations 510 to 515 in a couple of microseconds.

First alternative embodiment: A first alternative embodiment of the invention eliminates the need for accelerometer 32, speed measurement 41 and radius measurement 42. In the first alternative embodiment, the difference between the reel discharge speed and the line speed is measured by measuring the pull on reel 10 from line 30. The shaft of reel 10 can be mounted in a slot and pressure sensing pads can be positioned to detect the amount of tension on the shaft of reel 10, that is, to detect the tension exerted on reel 10 by line 30 in a direction parallel to the axis of rod 20. The output from sensor pads can go to the microprocessor 43 which increases the braking action if the signals from pads approaches zero.

If some pressure is detected by the pressure pads, it means that there is some tension in line 30 and that this tension is being applied to reel 10. In this condition the line speed equals the reel discharge speed and backlash is not occurring. When the pressure on the pressure pads goes from a position condition to a zero condition, it means that backlash will probably occur if more tension is not applied to reel 10. When this condition is detected, tension is applied to reel 10 by braking mechanism 40.

Figure 6:
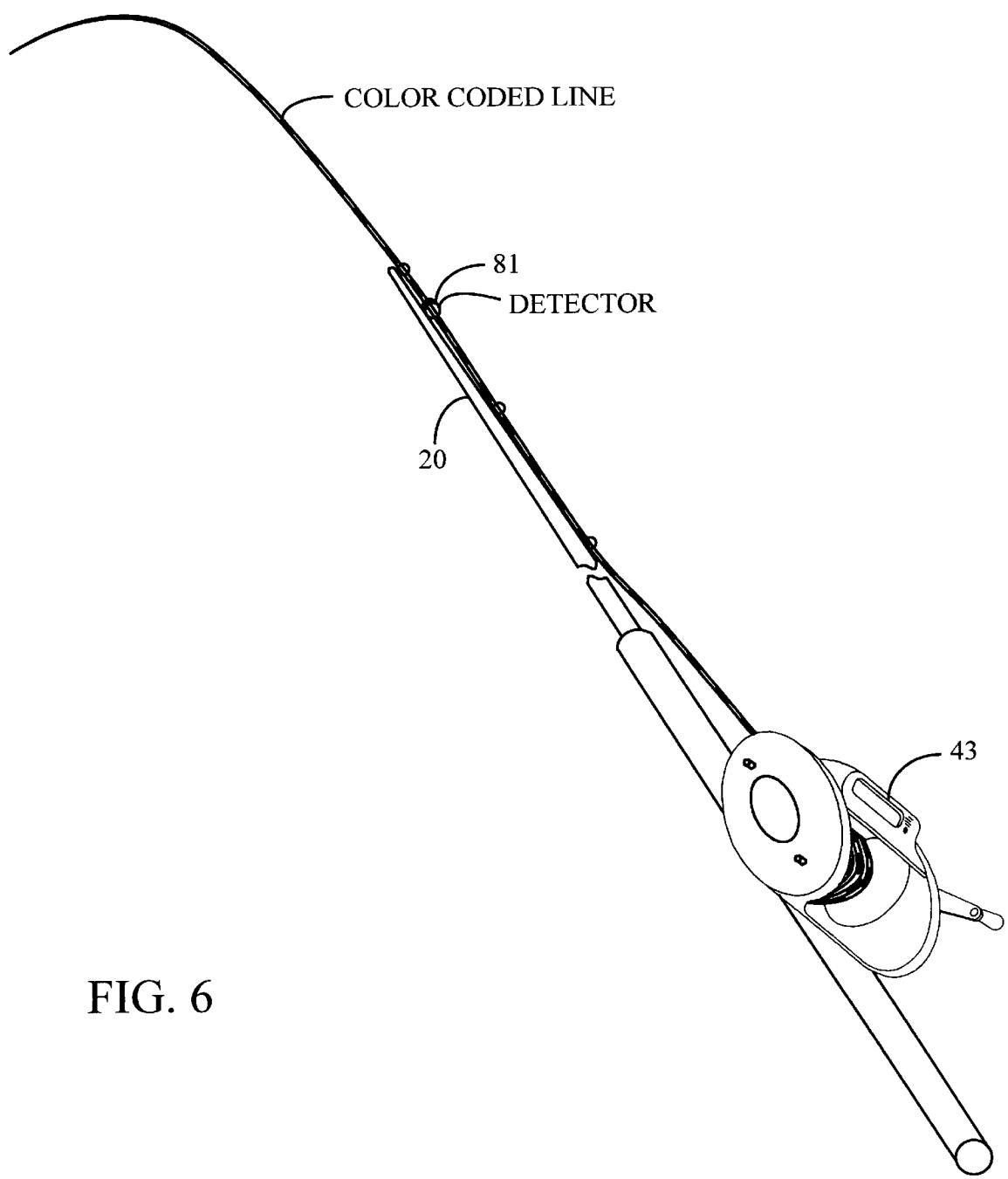
FIG. 6 is a second alternative embodiment showing markings on the fishing line.

Second Alternative embodiment: The second alternative embodiment utilizes sensors 41 and 42 as in the preferred embodiment of the invention. However, in the second alternative embodiment eliminates the need for accelerometer 32. In the second alternative embodiment, the line 30 has evenly spaced marks thereon as indicated in FIG. 6. The markings made of metallic particles and they can be detected when they pass a metallic sensor 81 which is position on pole 20. The signals from metallic sensor go to microprocessor 43 to indicate the line speed. The reel discharge speed is calculated as in the first embodiment. Any type of marking on the line which can be sensed is suitable for detecting line speed. For example, the markings can be magnetic and sensed by magnetic sensors or they can be a different color and sensed by a color sensor.

Figure 7:
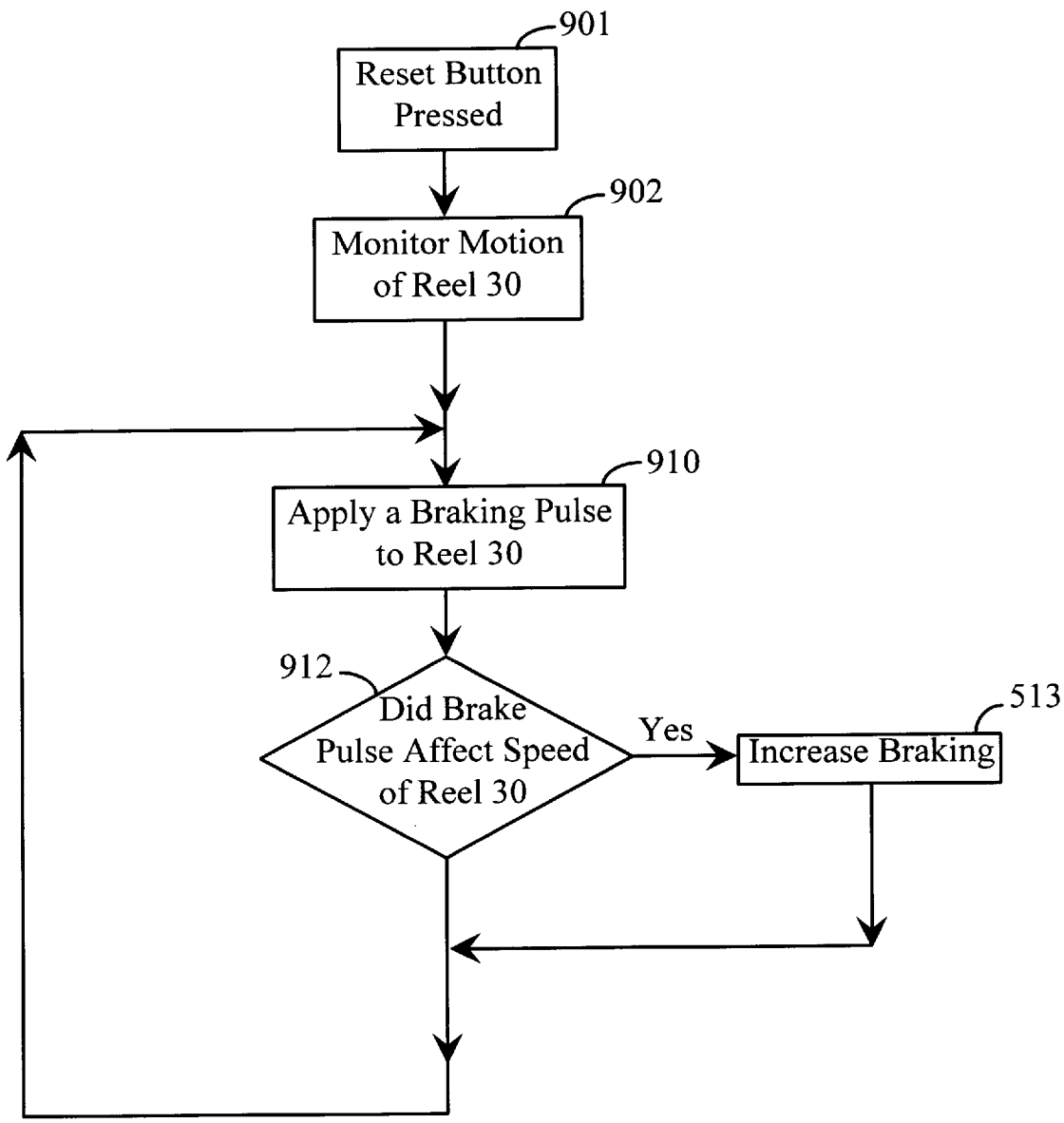
FIG. 7 is a flow diagram for the operations performed by a third alternative embodiment of the invention.

Third Alternative embodiment: The third alternative embodiment eliminates the need for accelerometer 32, and the need for sensor 42. In the third alternative embodiment the microprocessor 43 periodically applies braking pulses to brake 40 and the change in speed of the reel 10 in response to these pulses is detected by sensor 41. If the change in speed of reel 10 due to a braking pulse is small, it indicates that the line 30 is pulling line off of reel 10 and that no further braking is necessary. If on the other hand, the response to a braking pulse is relatively large, it indicates that the reel discharge speed is higher than the line speed and that more braking is necessary. In the third alternative embodiment, the microprocessor operates according to the block diagram shown in FIG. 7.

As indicated by block 901, the process starts when the reset button the microprocessor is pressed. The microprocessor monitors the speed of reel 30 by examining the pulses from sensor 41. As indicated by block 910, the microprocessor periodically applies a braking pulse to reel 30. The pulse can apply braking action for a couple of microseconds. The microprocessor checks for any change in reel speed as a result of the braking pulse (block 912). If there has been a change in speed due to the braking pulse, it indicates that the reel speed is higher than the line speed. As indicated by block 513, in this case the microprocessor increases the braking action of brake 40.

While the invention has been described with reference to various possible embodiments, it should be understood that many other variations in form and detail are possible without departing from the spirit and scope of the invention. The invention is limited solely by the appended claims.

I claim:

1. In a fishing system which includes a fishing pole, a fishing reel mounted on said fishing pole,
   a fishing lure, and a fishing line one end of which is attached to said lure and one end of
   which is wound around said fishing reel, the combination of:
   an electronically controllable brake for slowing the rotation of said reel, means for measuring the rotational speed of said reel, and a microprocessor for controlling the operation of said brake, said microprocessor periodically applying a braking pulse to said reel and detecting the reaction thereto and applying increased braking to said reel if said reel is slowed by said braking pulse.

* * * * *